United States Patent [19]

Cronin

[11] Patent Number: 4,473,752

[45] Date of Patent: Sep. 25, 1984

[54] AIRCRAFT ENGINE STARTING WITH SYNCHRONOUS AC GENERATOR

[75] Inventor: Michael J. Cronin, Sherman Oaks, Calif.

[73] Assignee: Lockheed Corporation, Burbank, Calif.

[21] Appl. No.: 382,790

[22] Filed: May 27, 1982

[51] Int. Cl.³ ............... F02N 11/04; H02K 23/60
[52] U.S. Cl. ................ 290/38 R; 123/179 D; 123/179 AS; 310/122; 310/156
[58] Field of Search ............. 290/38 R, 27; 123/179 AS, 179 B, 179 D, 179 M, 179 N; 322/13; 310/122, 156

[56] References Cited

U.S. PATENT DOCUMENTS

| | | | |
|---|---|---|---|
| 1,158,597 | 11/1915 | Wadsworth | 123/179 D |
| 1,620,747 | 3/1927 | Allison | 310/122 |
| 2,192,304 | 3/1940 | Gilliver | 310/164 |
| 2,897,384 | 7/1959 | Müller | 310/163 |

*Primary Examiner*—J. V. Truhe
*Assistant Examiner*—Shelley Wade
*Attorney, Agent, or Firm*—Louis L. Dachs

[57] ABSTRACT

The invention relates to a starter-generator machine (10) for starting turbine type aircraft engines. The machine combines an induction motor with a synchronous samarium cobalt generator. In the machine, a rotor-shaped stator (22) is fixed and positioned inside a squirrel-cage induction rotor (18) which has an array of samarium-cobalt magnets (24) attached on the outer diameter thereof. The compound dual machine operates as a starter by using the induction rotor to accelerate the permanent magnet rotor, and thus the aircraft engine via a drive pinion (34), up to some low synchronous speed, when ac power is applied to the outside stator (16) to lock in the permanent-magnet rotor (24) synchronously with the rotating field created in the stator (16) of the synchronous generator. As the speed of the rotor (24) is then increased, the engine speed is also increased via the drive pinion (34).

In a second embodiment, a cartridge type induction-motor (70) is utilized to initially start an aircraft engine. The motor (70) includes a gear reduction (74) and a disconnect clutch (76) and drives the engine through a splined pinion (78) which in turn drives an engine connected spline (98). When the speed of the machine is such that the synchronous operation of an outside permanent magnet rotor (96) commences, the clutch (76) is utilized to disconnect the induction motor cartridge (70), leaving the rotor (96) to drive the drive spline (98) via internal splines (94).

4 Claims, 3 Drawing Figures

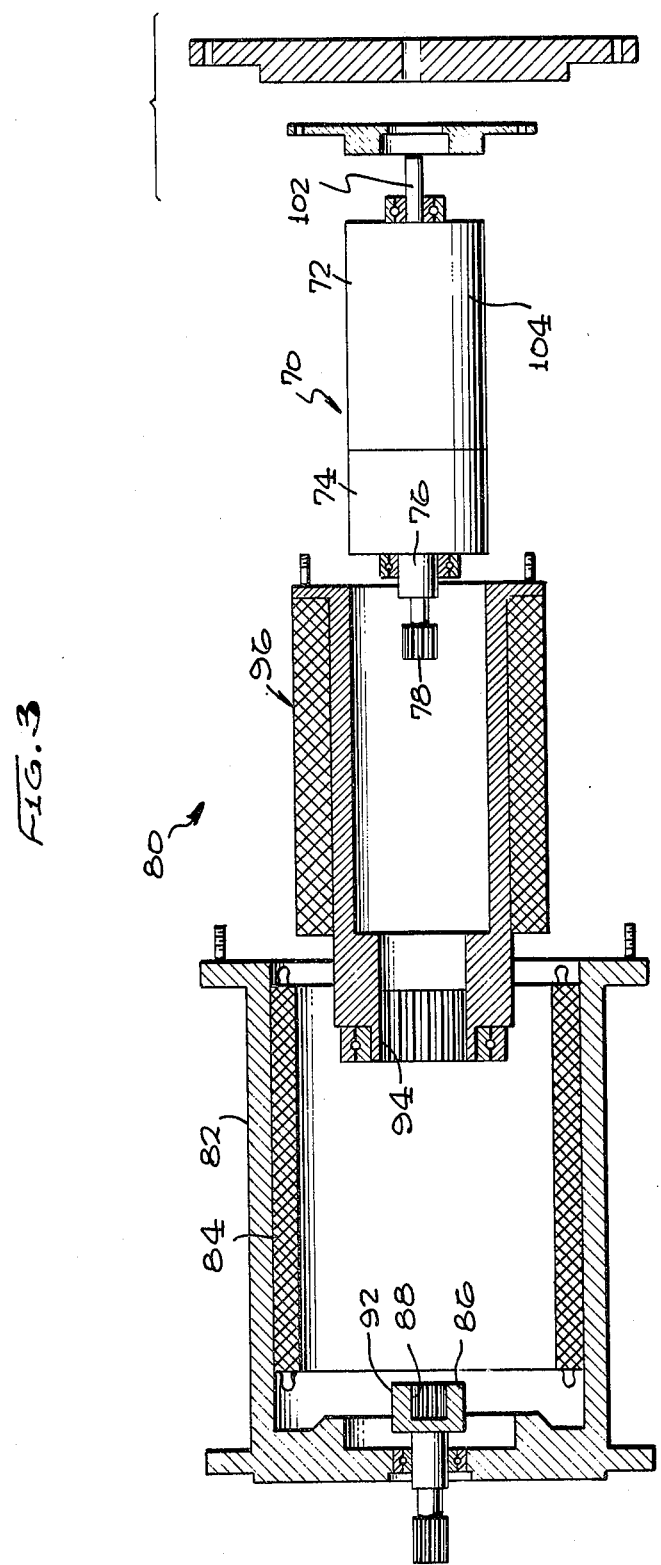

AIRCRAFT ENGINE STARTING WITH SYNCHRONOUS AC GENERATOR

TECHNICAL FIELD

The invention relates to the starting of aircraft turbine engines and in particular to starting aircraft turbine engines utilizing an induction motor integrated with a permanent magnet type rotor.

BACKGROUND ART

Electrical starting of small aircraft engines has, in the past, been accomplished using dc starter-generators or separate dc starter motors. A few generally unsuccessful attempts have been made to use synchronous ac generators as starters by using a constant speed drive as a torque converter, between the ac generator and the engine. In these latter systems, the synchronous machine was brought up to near-synchronous speed, using the damper or amortisseur winding on the rotor as an induction-starter, and then the dc rotor-field was energized to lock the rotor in synchronously with the rotating ac field. From this point, the engine was brought up to speed, using the constant speed drive as a torque-transmission device between the synchronous-motor and the engine. More recently, because of the lack of success of starting large aircraft engines with conventional synchronous generators, pneumatic starters have been used in most wide-bodied jets.

One of the few exceptions to the pneumatic starting method has been the use of, the recently developed permanent-magnet (samarium cobalt) generator as a starter. This starting system used a reverse-mode operation of a static power converter known as a "cycloconverter." In its generating mode, the system operated as a variable speed constant frequency power system in which the high frequency samarium cobalt generator power is converted to 400 Hz constant frequency/constant voltage power. One of the problems of such a system, however, was that the input frequency to the "cycloconverter" had to be at least 2 to 4 times higher than the output. Consequently, the generator had to run at very high speeds, (i.e., about 11,000 to 22,000 rpm) and utilize a large number of electromagnetic poles.

With the prospective emergence of the "All Electric Airplane" and the proposed use of large capacity generators, the subject of synchronous ac motor starting is again appropriate, since the generators are in a kilowatt range that makes them potentially suitable for starting even the very large aircraft engines. However, although these generators are likely to use permanent magnet type rotors, "straight" synchronous motor starting is not possible—particularly as there is no amortisseur winding. In answer to these problems, the present invention provides a unique and novel method and arrangement for integrating an induction motor within a permanent magnet type rotor in order to start turbine aircraft engines.

Use of a starter-generator attached to a single engine pad of an aircraft turbine is disclosed in U.S. Pat. No. 3,577,002 to Hall. The patent describes the use of a modern brushless ac generator operating in the role of a generator starter, but discloses use of a commutator and brushes rather than a completely brushless starter-generator configuration in accordance with the present invention. To offset the problem of operating the commutator and brushes after the engine is started, an electrically activated means is provided to lift the brushes off the commutator. Use of such a dc motor, however, is unsuited to starting of large aircraft engines, as for example 50,000 to 60,000 lb thrust engines.

Another patent which teaches utilization of a generator to start an aircraft engine is U.S. Pat. No. 3,264,482 to Clark et al. The '482 patent discloses a different system from the present invention which integrates a permanent magnet generator within a gas turbine engine. The permanent magnet generator performs the dual functions of power generation and synchronous motor starting. In performing the starter function, the generator follows the aforementioned method of using "power-electronics" to supply the starter-generator with variable voltage/variable frequency power. The present invention is designed as an advance over the '482 system which does not include an induction rotor and does not use any supplementary means to accelerate a rotor up to a "synchronization point."

A machine which includes a synchronous ac machine and a permanent magnet machine within a single housing is disclosed in U.S. Pat. No. 4,139,780 to Hucker et al. The machine, known as an integrated drive generator, is based upon a widely used practice of integrating a constant speed drive with a conventional wound-rotor generator and combines a synchronous ac primary generator/exciter/permanent magnet machine with a conventional hydromechanical constant speed drive. Unlike the present invention, this machine has as its primary objective, the generation of constant-frequency power; also it is not directed to aircraft turbine engine starting. As such, it does not utilize an induction rotor but rather describes the permanent magnet generator merely as a source of "control-power" for the voltage regulator/supervisory power, etc.

By contrast, British specification No. 820,180 to Harbord describes a co-axial integration of an induction machine within an inductor alternator. The machine, unlike the present invention, is not practically implementable for large aircraft engine starting. While the '280 machine utilizes an induction rotor (10) attached to a rotatable hub (13) attached to the squirrel cage induction rotor (21), the present invention describes the utilization of a high magnet strength permanent magnet rotor and a novel mechanical implementation of an induction motor/gearbox/clutch cartridge inside the permanent magnet rotor structure. Thus, the induction motor of the present invention is used novelly with a modern electronic start method.

From the foregoing it can be seen then that it is a primary object of this invention to provide a novel aircraft engine starting system which utilizes a synchronous generator as a starter of large and small aircraft engines by overcoming the problem of the "non-self-start" characteristic of a synchronous motor.

A further object of this invention is to provide a machine for starting large turbine aircraft engines which utilizes a highly reliable and robust induction motor to furnish the self-start portion of the engine start cycle.

It is also a further object of the present invention to provide a machine for starting aircraft engines which combines an induction motor with a synchronous permanent magnet type generator for carrying out the engine start function, and to provide at least two processes for implementing this function.

DISCLOSURE OF INVENTION

The invention relates to a system for starting small and large turbine type aircraft engines which utilizes a machine that combines an induction motor with a synchronous samarium cobalt generator. In this machine, a rotor-shaped stator is positioned inside a squirrel-cage induction rotor which has an array of samarium-cobalt magnets attached on the outer diameter thereof. The compound/dual machine operates as a starter by using the induction rotor to accelerate the PM rotor up to some low synchronous speed, where ac power can be applied to the outside stator of the synchronous-generator so as to lock-in the permanent magnet rotor synchronously with the rotating field created in the armature (stator) of the synchronous-generator.

The novel features which are believed to be characteristic of the invention, both as to its organization and its method of operation, together with further objects and advantages thereof, will be better understood from the following description, taken in connection with the accompanying drawings in which a presently preferred embodiment of the invention is illustrated by way of example. It is to be expressly understood, however, that the drawings are for purposes of illustration and description only, and are not intended as a definition of the limits of the invention.

BRIEF DESCRIPTION OF DRAWINGS

and FIG. 3 is an exploded view of an alternate process of assembling and constructing the starter-generator of the present invention.

PREFERRED EMBODIMENTS OF THE PRESENT INVENTION

As discussed hereinabove, the use of electric starter motors in the past to start aircraft engines has encountered many problems. More recently, pneumatic starters have been used with wide-bodied jets. With the advent of "all-electric airplane" technology, the large capacity generators utilized can provide the power requirements for very large engines. This invention relates to an induction motor integrated with a samarium cobalt type rotor to provide such a starter-generator.

The starter-generator of the present invention operates by using an induction rotor to accelerate a permanent magnet rotor up to some low synchronous speed, at which point ac power is applied to the outside stator to lock the rotor in synchronously with the rotating field created in the outside ac stator. From then on, the machine operates as a "synchronous-motor" bringing the engine up to idle speed as the frequency of the power applied to the outside ac stator is increased at a programmed rate.

Figure 1:
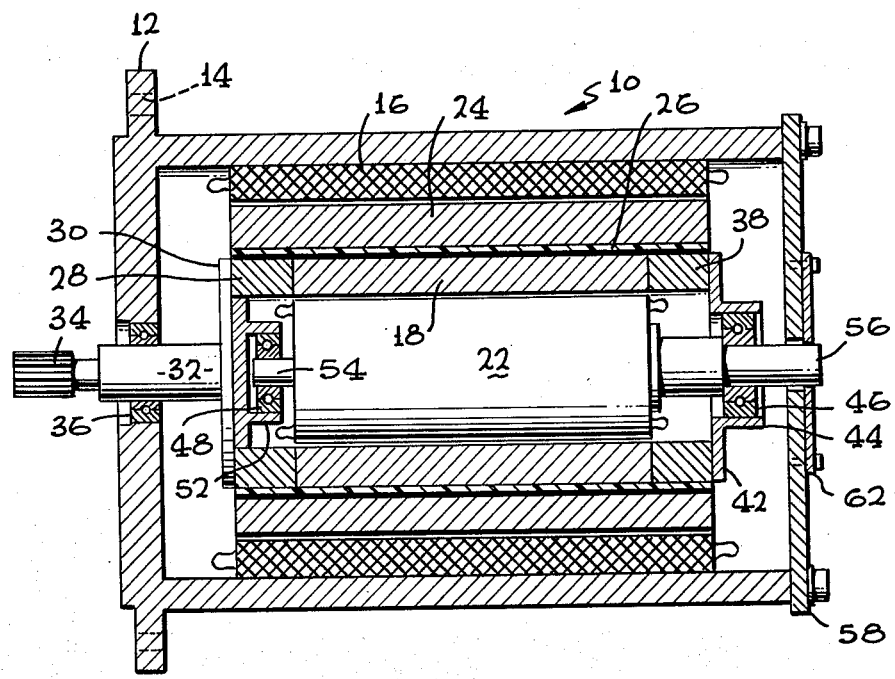
FIG. 1 is a simplified schematic of an "inverted" induction motor in accordance with the present invention.

Referring now to FIG. 1, there is shown therein a schematic of a combination induction/synchronous generator-starter (10) which is mounted to an aircraft engine (not shown) via an engine mounting flange (12) including mounting bolt holes (14). The primary elements of the generator-starter (10) include a main ac outside armature or stator (16), a squirrel-cage induction rotor (18) and a rotor shaped inside stator (22) shown inserted inside the squirrel-cage induction rotor (18). The squirrel-cage induction rotor (18) includes an array of samarium cobalt type magnets (24) which form a permanent magnet rotor attached to its outer diameter, shown to be a non-magnetic sleeve (26) which typically might be constructed of Inconel material.

The induction rotor (18) terminates at each end with an end ring (28) and plate (30) secured to drive shaft (32) and drive pinion (34) which engages with the aircraft engine (not shown). The shaft (32) is journalled within a set of bearings (36). The other end of the induction rotor (18) terminates with an end ring (38) and an L-shaped end plate (42) having a section (44) thereof journalled about a set of bearings (46).

To allow for rotation of the induction rotor (18) about the fixed inside stator (22), another set of bearings (48) is provided between L-shaped element (52) secured to or integral with end plate (30) and the round stub-shaft (54) of the stator. Wiring for the stator (22) is provided through the fixed hollow shaft (56). The end of the generator-starter (10) remote from the aircraft engine (not shown) is also seen to terminate in an end flange plate (58) and a locking plate (62), which constrains the stator against rotation.

The starter-generator (10) operates as a starter by using the induction rotor (18) to accelerate the permanent magnet rotor (magnet array (24)) up to some preselected low synchronous speed, at which point ac power is applied to the outside stator (16) to lock the permanent magnet rotor (24) in synchronously with the rotating field created in the outside ac stator (16). From then on, the starter-generator operates as a "synchronous-motor" bringing the engine up to idle speed by increasing the frequency of the power applied to the outside ac stator (16). During this phase, the rotating field created in the inside stator (22) is de-energized, terminating any torque contribution to the engine start by the induction rotor. It should be noted that the above-described induction rotor/permanent magnet configuration is practical for loads such as compressors and other devices, which have low acceleration/dynamic torque requirements where the power demand is nominally low.

Figure 2:
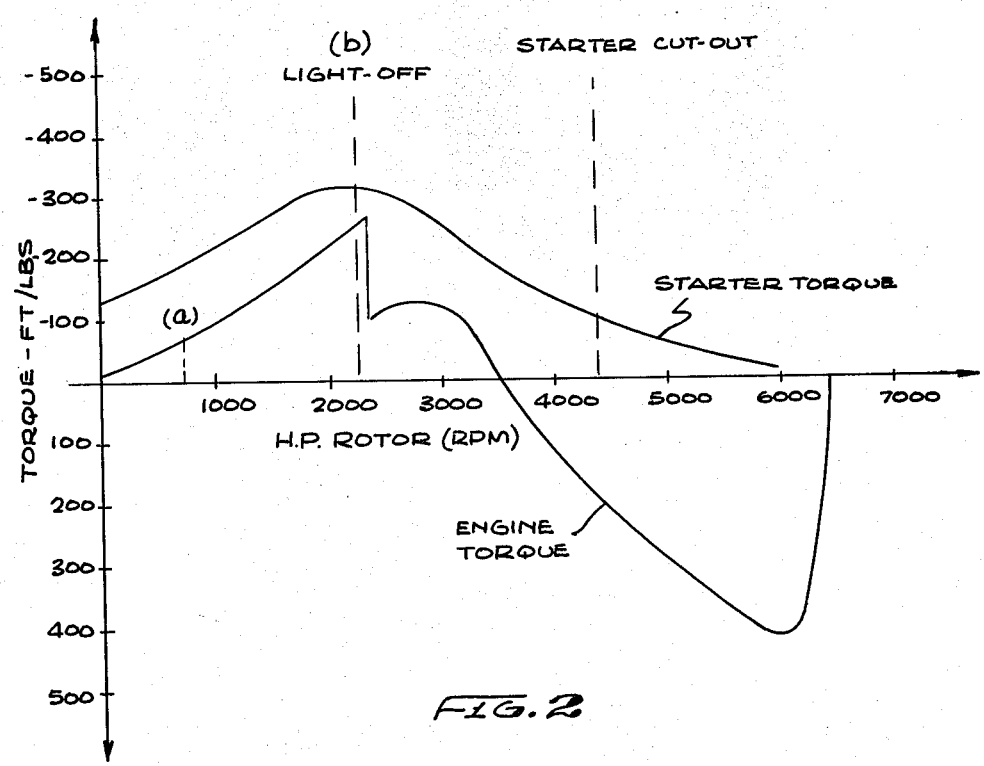
FIG. 2 is a graph showing the start characteristics of a typical aircraft turbine engine.

Therefore, while the FIG. 1 machine is quite satisfactory for starting compressors, pumps and certain small engines, it is not ideal for starting engines where the torque requirements, as shown by FIG. 2, are large and exacting. Thus, FIG. 3 shows an alternative embodiment of the present invention that is more appropriate for starting large aircraft engines, having very high torque demands, during cold-day starting, etc.

Referring now to FIG. 2, it can be observed that in starting larger type aircraft turbine engines, the peak drag-torque near engine "light-off" may be as high as 300 foot-pounds or more. Also, because of the very high inertia of the engine, the starter must develop "acceleration-torque" as well as a torque to overcome friction and compressor-load.

FIG. 3 is a simplified implementation of an alternative embodiment of FIG. 1. However, in this particular embodiment, a conventional rather than "inverted" type induction motor is used. In this exploded view of the embodiment, there is shown what could be described as an "induction-motor-cartridge" (70), consisting of a high speed squirrel-cage induction motor (72), a high-ratio reduction gearbox (74), and a spring, or other type, disconnect clutch (76). The internal rotor of the induction motor (72) (not shown) drives the splined pinion (78) through the gear reduction gearbox (74) and the clutch (76).

The features inherent in the above cartridge approach are that high torques can be developed at the pinion gear (78) while the high reduction gear ratio significantly minimizes the inertia to the rotor of the induction motor (72) by the engine.

Referring again to FIG. 3, the starter-generator (80) is shown to include, along with the induction motor cartridge (70), the stator housing (82), including a main 3 phase ac (armature) stator winding (84). A drive mechanism rotatable within the end of the housing (82) includes a C-shaped drive gear (86) which has internal splines (88) and external splines (92) to engage simultaneously with the pinion gear (78) of the induction motor (72), and the internal-splines (94) of the rotor (96). The rotor (96) is a permanent magnet rotor, such as for example samarium cobalt.

When the starter-generator (80) is assembled, the induction motor cartridge fits within the permanent magnet rotor (96), which in turn is rotatably secured within the stator housing (82). Thus, when the internal rotor of the induction motor cartridge (70) rotates the splined pinion (78), the drive spline (98), which drives and is driven by the engine (not shown), rotates. At the same time, the external splines (92) of the drive gear (86) drive the permanent magnet rotor (96). When the rotor (96) is utilized in accordance with the present invention to drive the gear (86), the disconnect clutch (76) is activated to release the back-driving of the gear-train and the internal rotor (not shown) of the induction motor cartridge (70).

Operation of the FIG. 3 starter-generator is similar to the FIG. 1 embodiment in that the induction motor cartridge (70) is used to bring the aircraft engine's high pressure rotor up to a predetermined value of, for example, about 5-10% of its maximum speed, and then the ac stator (84) field is energized. From this point, the engine is accelerated up to its idle speed, usually about 45% to 55%, as before, using the generator as a synchronous motor-starter. Reference is made to copending patent applications U.S. Ser. No. 183,079 filed Sept. 2, 1980, entitled "Direct-Driven Generator System for Environmental Control System and Engine Starting" and U.S. Ser. No. 370,760, filed Apr. 22, 1982 entitled "AC Motor-Starting for Aircraft Engines Using APU Free Turbine Driven Generators," both assigned to the assignee herein and incorporated herein by reference. These applications describe the operation of synchronous-motor starting of aircraft engines. The purpose of the present invention is to provide a system for bringing the synchronous generator up to a predetermined speed (where it can be synchronized) without the use of power-electronics that require a rotor position sensor to commutate the electronics, synthesizing the rotating field.

Referring again to FIG. 2, it is shown that at about 700 rpm or about 7% engine speed, the engine compressor drag-torque is approximately 60 ft.lb., and the starter torque curve shows about 200 ft.lb: the difference being used to accelerate the compressor. The power to drive the rotor at 700 rpm (point (a)) excluding acceleration-torque is therefore only approximately 8 hp, but at the "light-off" speed, the power to drive the compressor rotor at the 2200 rpm (point (b)) will rise to about 105 hp. Thus, in the induction start-phase, only about 8 to 10 hp need be developed since the output torque of the cartridge starter will intersect the compressor torque at 2200 rpm: in the "synchronous-starter" phase, however, the starter-generator must develop 126 hp or more at light-off rpm, to accelerate the engine up its ground idle speed.

Description of the engine start operation of the FIG. 3 embodiment is as follows: When the Figure component-elements are joined, the assembly becomes a combination induction-motor/synchronous-generator. In the "start-mode," 3 phase 400 Hz or 800 Hz power is applied through the fixed hollow shaft (102), which is attached to the stator housing (104). Simultaneous with this ac power application, the spring or other type disconnect clutch (76) is energized to connect the squirrel-cage induction rotor to the engine, via the reduction-gearing in gearbox (74). The engine is then accelerated to a (low) near-synchronous speed by using an induction motor (70) with a low full-load "slip." Since the induction motor (70) is also driving the main permanent magnet rotor (96), via the external splines (92), it can be seen that when power is applied to the main ac stator winding (84) (and disconnected from the induction-motor stator), the main rotor (96) can pull into synchronism with the rotating field of the main stator (84).

From the above "synchronization" point, the frequency and voltage of the power applied to the main ac stator (84) is increased in the manner described in the aforementioned co-pending patent applications U.S. Ser. Nos. 183,079 and 370,760. This ensures that the starter engine is accelerated up to its "starter-cut-out-speed" with the ac synchronous generator operating as a synchronous starter-motor. There are therefore two phases to the start-cycle: the first phase with, for example, direct line-switching of the induction-motor, and the second phase using variable voltage/variable frequency power applied to this synchronous starter-generator. In the first phase, the acceleration of the engine will be dependent on the torque-to-inertia ratio developed by the induction motor.

It will be recognized, by those versed in the art, that if a high resistance rotor design is used for the induction motor, then a high torque can be developed at "standstill," but the motor will run at a higher slip (lower-speed) thereby requiring a slightly higher reduction gearbox-ratio. With a low-resistance/high-reactance rotor-design, the developed-torque will be lower, but the running speed will be higher. Without the use of special motor designs, such as the "double-cage" rotors, the higher-resistance rotor is preferred. In the second (synchronous-motor) phase, once synchronization is accomplished, the rate-of-acceleration of the engine will be dependent on the rate at which the frequency of the power supply (such as is derived from an auxiliary power unit) is increased. The torque developed during this phase will be programmed (or scheduled) by means of stator-current control.

The present invention offers several advantages for starting large aircraft engines and other prime movers, as follows:

(1) It enables use of a synchronous generator as a starter of both small and large engines, by overcoming the problem of the "non-self-start" characteristic of a synchronous-motor.

(2) The invention utilizes a highly reliable/robust induction as the "self-start" portion of the engine start cycle.

(3) The invention configurations of FIGS. 1 and 3 are each particularly advantageous for starting small engines or other loads and large engines, respectively.

(4) The start systems allow for electrical and mechanical isolation of the induction motor when the engine-starter reaches the synchronization point.

(5) Above the "starter cut-out" point, the synchronous-motor inherently operates as a conventional synchronous-generator.

(6) The starter-generator machines of the present invention can be ideally interfaced within static power supplies having programmable outputs and/or special auxiliary power unit generating systems.

(7) The co-axial construction aspects of the machine makes for a compact design, important in aircraft environments.

(8) The induction machine can be used for "motoring" the aircraft's engines on the ground from a low frequency power supply such as a 3 phase 200 V 60 Hz supply which is readily available as a commercial power supply source.

The latter advantage can be quite significant. As those who are familiar with turbine engine technology are aware, after a turbine engine has been shut down in a hot condition, various parts of the engine cool at different rates (because of their different thermal mass). Consequently, if the engine is re-started before all parts have reached equilibrium temperature, there is a possibility that the turbine blades or the compressor blades could interfere (rub on) the engine casing; other problems have been generally defined as "rotor-bowing." To ameliorate, or prevent, these prospects, the induction motor of the subject invention could be used to motor the engine at a low speed by connecting said motor to an external 60 Hz power source, while passengers are de-planing and en-planing.

It is apparent that there has been provided with this invention a novel system for aircraft engine starting with synchronous ac generator which fully satisfies the objects, means and advantages set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. A combination induction motor/synchronous generator machine for starting engines and providing electric power comprising:
    a cartridge-type induction motor arranged to drive said engine via an output shaft having a splined pinion; said induction motor having a squirrel-cage rotor rotatably secured within a fixed polyphase stator;
    a permanent magnet starter-generator arranged to be driven by said induction motor, said starter generator also being arranged to drive and be driven by said engine; and
    a cup-shaped assembly including a first portion having internal and external splines and a second portion having a drive spline for driving and being driven by said engines, said output shaft splined pinion being arranged to engage with said internal splines and said permanent-magnet starter generator including an internal spline portion arranged to engage with said external splines.

2. A combination induction motor/synchronous generator machine as in claim 1, wherein said starter-generator includes an assembly of permanent magnets in co-axial, separate and surrounding relation to the stator of said induction motor.

3. A combination induction motor/synchronous generator machine as in claim 2 in which said magnet assembly is co-axially mounted around the cylindrical stator of said induction motor by a pair of bearings which permit rotation of said assembly about said stator.

4. A combination induction motor/synchronous generator machine as in claim 1, or 3, wherein said induction motor cartridge includes a reduction gearbox and a disconnect clutch located between said rotor and said splined pinion, said disconnect clutch being adapted to be activated when it is desired to isolate said reduction gearbox and said rotor from said intersecting engine and starter generator.

* * * * *